United States Patent
Kim et al.

(10) Patent No.: US 7,126,953 B2
(45) Date of Patent: Oct. 24, 2006

(54) APPARATUS FOR TRANSFER OF VOICE TRAFFIC IN VODSL GATEWAY

(75) Inventors: Sang-Hyun Kim, Ansan-Shi (KR); Moon-Kyu Choi, Sungnam-Shi (KR)

(73) Assignee: LG-Nortel Co., Ltd., Seoul (KR)

( * ) Notice: Subject to any disclaimer, the term of this patent is extended or adjusted under 35 U.S.C. 154(b) by 864 days.

(21) Appl. No.: 10/025,854

(22) Filed: Dec. 26, 2001

(65) Prior Publication Data
US 2002/0082840 A1   Jun. 27, 2002

(30) Foreign Application Priority Data
Dec. 26, 2000   (KR) ............... 2000-0082026

(51) Int. Cl.
  H04L 12/28   (2006.01)
  H04J 3/04   (2006.01)
(52) U.S. Cl. .................... 370/401; 370/535
(58) Field of Classification Search ............ None
  See application file for complete search history.

(56) References Cited

U.S. PATENT DOCUMENTS

| | | | | |
|---|---|---|---|---|
| 5,390,198 A * | 2/1995 | Higgins | ............... | 714/796 |
| 5,729,536 A * | 3/1998 | Doshi et al. | ............... | 370/398 |
| 5,867,490 A * | 2/1999 | Campanella | ............... | 370/326 |
| 5,867,494 A * | 2/1999 | Krishnaswamy et al. | ... | 370/352 |
| 5,953,339 A * | 9/1999 | Baldwin et al. | ............ | 370/397 |
| 6,018,521 A * | 1/2000 | Timbs et al. | ............... | 370/342 |
| 6,292,662 B1 * | 9/2001 | Ziv et al. | ................ | 455/445 |
| 6,434,139 B1 * | 8/2002 | Liu et al. | ................ | 370/352 |
| 6,545,425 B1 * | 4/2003 | Victor | .................. | 315/169.3 |
| 6,583,737 B1 * | 6/2003 | Schrodinger | ............... | 341/100 |
| 6,658,027 B1 * | 12/2003 | Kramer et al. | ............ | 370/516 |
| 6,873,689 B1 * | 3/2005 | Butler et al. | ............ | 379/93.05 |

* cited by examiner

Primary Examiner—Chau Nguyen
Assistant Examiner—Cynthia L. Davis
(74) Attorney, Agent, or Firm—Fleshner & Kim, LLP

(57) ABSTRACT

An apparatus and method for the transfer of voice traffic in a Voice over Digital Subscriber Line (VoDSL) gateway are disclosed, which are capable of transferring the voice traffic without use of a central processing unit (CPU). The gateway provides an interface between an asynchronous transfer mode (ATM) network and a public switched telephone network (PSTN). The gateway includes a first ATM interface that communicates an ATM cell signal with the ATM network, a vocoder that communicates a voice signal with the PSTN by a channel, and a time division multiplex (TDM) bus that communicates a voice traffic signal between the first ATM interface and the vocoder.

16 Claims, 9 Drawing Sheets

APPARATUS FOR TRANSFER OF VOICE TRAFFIC IN VODSL GATEWAY

BACKGROUND OF THE INVENTION

1. Field of the Invention

The present invention relates to the transfer of voice traffic in a Voice over Digital Subscriber Line (VoDSL) and, more particularly, to a time division multiplex (TDM) bus that reduces the load on a central processing unit (CPU).

2. Background of the Related Art

A communication system employing an Asynchronous Transfer mode (ATM) network is based on a digital signal process, and a communication system employing a Public Switched Telephone Network (PSTN) is based on an analog signal process. A VoDSL gateway is generally provided between the digital ATM network and the analog PSTN to transmit and receive signals there between.

The construction and operation of a related art apparatus used for the transfer of voice traffic in a VoDSL gateway will be described with reference FIGS. 1–3.

FIG. 1 is a block diagram showing a coupled construction of an ATM network system and a PSTN system. As shown in this drawing, a plurality of Asymmetric Digital Subscriber Line (ADSL) modems 3 are each connected in common to a telephone 1, which enables communication using a voice signal, and to a personal computer (PC) 2 that processes digital data and conducts communication using the processed digital data. The ADSL modems 3 function to transmit and receive digital data in an asymmetric manner.

A Digital Subscriber Line Access & Multiplex (DSLAM) unit 5 is connected in common to the plurality of ADSL modems 3, to multiplex output signals from the ADSL modems 3. An ATM switch or ATM network 6 is connected to the DSLAM unit 5 to switch a digital signal from the DSLAM unit 5 to a desired destination, at high speed.

A VoDSL gateway 7 is connected to the ATM network 6 to convert a digital ATM cell signal, from the ATM network 6, into an analog signal and transfer the converted analog signal to the desired destination. The VoDSL gateway 7 is also adapted to convert an analog signal, received from the desired destination, into a digital ATM cell signal and transfer the converted digital ATM cell signal to the ATM network 6.

A PSTN 8 is connected to the VoDSL gateway 7 to switch the analog signal from the VoDSL gateway 7 to the desired destination. The PSTN 8 also functions to provide the analog signal from the desired destination to the VoDSL gateway 7.

In operation, if the telephone 1 designates a desired destination and generates an analog signal thereto, then the corresponding ADSL modem 3 receives the generated analog signal, converts it into a digital signal, and outputs the converted digital signal to the DSLAM unit 5.

Alternatively, if the PC 2 designates a desired destination and generates a digital signal thereto, then the corresponding ADSL modem 3 receives the generated digital signal and outputs it to the DSLAM unit 5 at high speed. The ADSL modem 3 also applies an output signal from the DSLAM unit 5 to the telephone 1 or PC 2.

The DSLAM unit 5 multiplexes output signals from the plurality of ADSL modems 3 and transfers the resulting signal to the ATM network 6. The DSLAM unit 5 further demultiplexes an output signal from the ATM network 6 and accesses one of the plurality of ADSL modems 3, corresponding to the demultiplexed signals, to apply the demultiplexed signals to the corresponding ADSL modem 3.

The ATM network 6 is adapted to switch signals at high speed in an asynchronous manner. In the case where a destination of a signal, transmitted from a subscriber to the ATM network 6, is a subscriber accommodated in the PSTN 8, the ATM network 6 outputs the transmitted signal to the VoDSL gateway 7. The ATM network 6 further switches a digital ATM cell signal from the VoDSL gateway 7 to a corresponding subscriber.

The VoDSL gateway 7 converts a digital ATM cell signal from the ATM network 6 into an analog signal and transfers the converted analog signal to the PSTN 8. The VoDSL gateway 7 also converts an analog signal from the PSTN 8 into a digital ATM cell signal and transfers the converted digital ATM cell signal to the ATM network 6.

The PSTN 8 switches the analog signal from the VoDSL gateway 7 to a subscriber of the desired destination. The PSTN 8 also switches the analog signal from the subscriber of the desired destination to the VoDSL gateway 7, to transfer the signal to the subscriber of the ATM network 6.

As mentioned above, the VoDSL gateway 7 converts a digital ATM cell signal from the ATM network 6 into an analog signal and transfers the converted analog signal to the PSTN 8. Additionally, the VoDSL gateway 7 converts an analog signal from the PSTN 8 into a digital ATM cell signal and transfers the converted digital ATM cell signal to the ATM network 6. In this regard, the VoDSL gateway 7 is an important system unit for interfacing a digital network and an analog network.

The construction of the VoDSL gateway 7 is shown in detail in FIG. 2. The VoDSL gateway 7 includes a master or ATM interface 10 interfaced to the ATM network 6, for transmitting and receiving digital ATM cell signals to/from the ATM network 6. Also, the VoDSL gateway 7 includes a plurality of targets or vocoders 20 that are each interfaced to the PSTN 8, for converting an analog signal from the PSTN 8 into a digital signal and vice versa. The ATM interface 10 and the plurality of vocoders 20 are interconnected via a Peripheral Component Interconnect (PCI) bus.

The master or ATM interface 10 includes a CPU 13, connected to the ATM network 6, that processes an ATM cell signal or voice signal from the ATM network 6 in real time, according to an ATM Adaptation Layer 2 (AAL2) Common Part Sublayer (CPS) protocol and a Service Specific Convergence Sublayer (SSCS) protocol. Namely, the CPU 13 disassembles an ATM cell signal or reassembles the disassembled cells in real time and monitors and controls other function blocks.

The master or ATM interface 10 further includes a memory 15 for storing a voice traffic signal generated by the process of the CPU 13, based on the AAL2 CPS and SSCS protocols. A PCI bridge 17 transmits an output signal from the memory 15 to a corresponding one of the vocoders 20 over the PCI bus, receives an output signal from the corresponding vocoder 20 over the PCI bus, and stores the received signal in the memory 15 under the control of the CPU 13.

Each of the targets or vocoders 20 includes a PCI bridge 27 for transmitting and receiving digitized voice traffic signals to/from the ATM interface 10, over the PCI bus. A memory 25 stores the voice traffic signal received by the PCI bridge 27 and outputs the stored signal in response to an associated control signal. A CPU 23 reads the voice traffic signal stored in the memory 25, converts it into a Voice Telephony over ATM (VToA) signal, and outputs the converted VToA signal to a digital signal processor (DSP) (not shown).

The DSP is adapted to perform a vocoding operation that converts a VToA voice traffic signal into a G.711 PCM signal. The DSP outputs the G.711 PCM signal to the PSTN 8 via an associated interface.

The vocoders 20 may process, for example, 512 subscriber channel voice traffic signals. A larger number of vocoders may be employed to rapidly process a larger number of channel signals at the same time. The ATM interface 10 may control signals to be processed in four vocoders 20, for example.

There is a need to have the number of vocoders 20 correspond to the number of channels connected to the PSTN 8. Also, a sufficient number of ATM interfaces 10 to control the vocoders 20 is desirable. The vocoders 20 and the ATM interfaces 10 transmit and receive data over the PCI bus.

The PCI bus is operated in a memory mapped I/O manner under CPU control. The CPUs 13 and 23 in the ATM interface 10 and vocoder 20 operate the PCI bridges 17 and 27 in concert with and in the same manner as the memories 15 and 25, respectively.

FIG. 3 is a data input/output timing diagram of the VoDSL gateway 7. A detailed operational description will hereinafter be given of the ATM interface 10 reading a voice traffic data signal written in a specific one of the vocoders 20, as an example, with reference to FIG. 3.

To access and read data from the specific vocoder 20, the ATM interface 10 generates a frame signal FRAME# to notify the plurality of vocoders 20 that the PCI bus operation is beginning. Then, the ATM interface 10 drives an address and data signal AD to select the specific vocoder 20.

The ATM interface 10 also outputs a command and byte enable signal C/BE# to the specific vocoder 20 to inform it as to whether the PCI bus operation type is a read or write operation. Further, the ATM interface 10 outputs an initiator ready signal IRDY# to the specific vocoder 20 to notify it that the ATM interface 10 is ready to receive a voice traffic data signal.

After the frame signal FRAME# is sent to the specific vocoder 20, the voice traffic data signal is transferred from the vocoder 20 to the ATM interface 10 on the combined basis of the initiator ready signal IRDY# and a target ready signal TRDY#, from the vocoder 20. In more detail, when the initiator ready signal IRDY# from the ATM interface 10 has a low level and the target ready signal TRDY# from the specific vocoder 20 also has a low level, the vocoder 20 repeatedly sends the voice traffic data signal over the PCI bus and the ATM interface 10 reads it from the PCI bus. At this time, the ATM interface 10 generates a device selection signal DEVSEL# to notify the other vocoders 20 that it is occupying the PCI bus, continuously, to read the voice traffic data signal from the specific vocoder 20. In response to the device selection signal DEVSEL#, the other vocoders 20 make no request to occupy the PCI bus.

If the transfer of the voice traffic data signal is completed through the above procedure, then the ATM interface 10 and the specific vocoder 20 discontinue generating their respective ready signals IRDY# and TRDY#. Further, the ATM interface 10 removes the frame signal FRAME# and device selection signal DEVSEL# to notify the other vocoders 20 that the data transfer has been completed.

In FIG. 3, the reference character CLK denotes a clock signal that the ATM interface 10 generates for synchronization of the PCI bus. All signals other than the target ready signal TRDY# from the vocoder 20 are generated by the ATM interface 10, which is a master of the PCI bus. The address and data signal AD is a bi-directional signal.

In the related art VoDSL gateway, resources, such as the ATM interface 10 and the plurality of vocoders 20, share the PCI bus. Such bus sharing creates a need for arbitration of the PCI bus occupancy, leading to an increase in the load on the CPU 13.

Further, in the case where the PCI bus is employed in the VoDSL gateway, all resources cannot occupy the PCI bus at the same time. This causes a delay in voice traffic signals for resources not occupying the PCI bus. Such a delay causes a loss in voice traffic signals and, in turn, a degradation in the quality of service (QoS) of the voice communication.

SUMMARY OF THE INVENTION

An object of the invention is to solve at least the above problems and/or disadvantages and to provide at least the advantages described hereinafter.

Therefore, an object of the present invention is to provide an apparatus that transfers voice traffic in a VoDSL gateway using a TDM-based PCI bus between an ATM interface and the vocoders.

It is another object of the present invention to reduce the amount of load on a CPU.

It is a further object of the present invention to improve the QoS of a voice traffic signal.

In accordance with the present invention, the above and other objects can be accomplished by the provision of an apparatus for transfer of voice traffic in a Voice over Digital Subscriber Line (VoDSL) gateway that performs an interfacing operation between an asynchronous transfer mode (ATM) network and a public switched telephone network (PSTN). The apparatus includes an ATM interface interfaced to the ATM network for transmitting and receiving ATM cell signals to/from the ATM network; one or more vocoders each interfaced to the PSTN for transmitting and receiving voice signals by channels to/from the PSTN; a time division multiplex (TDM) bus for transferring voice traffic signals between the ATM interface and the vocoders; and a clock generator providing a plurality of clock signals for frame synchronization and packet synchronization to the ATM interface and vocoders.

Preferably, the ATM interface may include a central processing unit (CPU) for disassembling an ATM cell signal or reassembling disassembled cells in real time, according to ATM Adaptation Layer 2 (AAL2) Common Part Sublayer (CPS) and Service Specific Convergence Sublayer (SSCS) protocols. The CPU also monitors and controls other function blocks. A memory stores a voice traffic signal generated by a process of the CPU, based on the AAL2 CPS and SSCS protocols. Additionally, the memory stores voice traffic signals transferred from the vocoders. A memory interface provides data input and output for the memory. A multiplex/demultiplex unit demultiplexes a voice traffic signal from the memory interface, to branch the demultiplexed results to the vocoders, and multiplexes the voice traffic signals from the vocoders, to output the multiplexed result to the memory interface. A TDM interface transmits and receives the voice traffic signals to/from the vocoders over the TDM bus, synchronously with the TDM timing.

The TDM interface may include an aligner for phase-aligning voice traffic signals, from the multiplex/demultiplex unit, synchronously with the TDM timing. Also, the aligner phase-aligns the voice traffic signals, from the vocoders, synchronously with the TDM timing. Thereafter, the aligner outputs the phase-aligned signals to the multiplex/demultiplex unit. A parallel/serial converter converts parallel voice traffic signals from the aligner into a serial voice traffic signal, outputs the converted serial voice traffic signal to the TDM bus, converts a serial voice traffic signal sent over the TDM bus into parallel voice traffic signals, and outputs the converted parallel voice traffic signals to the aligner.

Preferably, each of the vocoders may include a TDM interface connected to the TDM bus that synchronizes the voice traffic signals, transmitted and received to/from the ATM interface, with the TDM timing. The TDM interface also converts a serial voice traffic signal into parallel voice traffic signals. A memory stores the parallel voice traffic signals from the TDM interface and a voice traffic signal from the PSTN. A memory interface accesses the memory to read or write data from or to the memory. And a CPU periodically reads voice data stored in the memory, transfers the read voice data to a digital signal processor (DSP), and stores voice data transferred from the DSP in memory.

The objects of the invention may be further achieved in whole or in part by a method of communicating data, including demultiplexing a multiplexed stream of first parallel data units into multiple streams of second parallel data units, phase-aligning the multiple streams of second parallel data units in synchronization with a standard time phase, converting each of the multiple phase-aligned streams of second parallel data units into a stream of first serial data, and communicating each of the streams of first serial data through a time division multiplex (TDM) bus in an assigned time slot.

The objects of the invention may be further achieved in whole or in part by a communication gateway, including a multiplexer/demultiplexer (demux) that demultiplexes a multiplexed stream of first parallel data units into multiple streams of second parallel data units, an aligner that phase-aligns the multiple streams of second parallel data units in synchronization with a standard time phase, a parallel-to-serial converter that converts each of the multiple phase-aligned streams of second parallel data units into a stream of first serial data, a time division multiplex (TDM) bus that communicates each of the streams of first serial data, and a serial-to-parallel converter that receives each of the streams of first serial data from the TDM bus in an assigned time slot.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
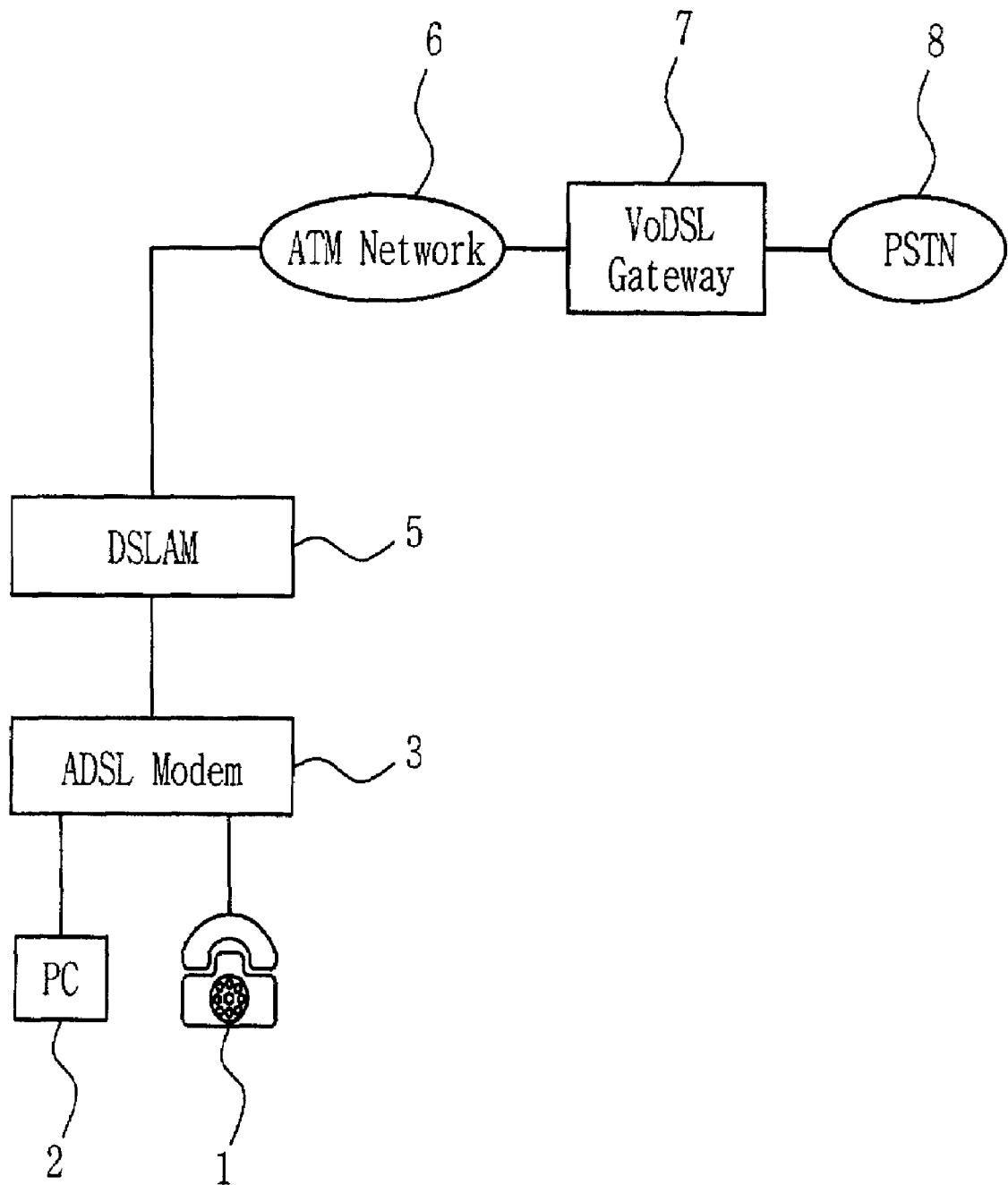
FIG. 1 illustrates a coupled construction of a related art ATM network system and PSTN system.
Figure 2:
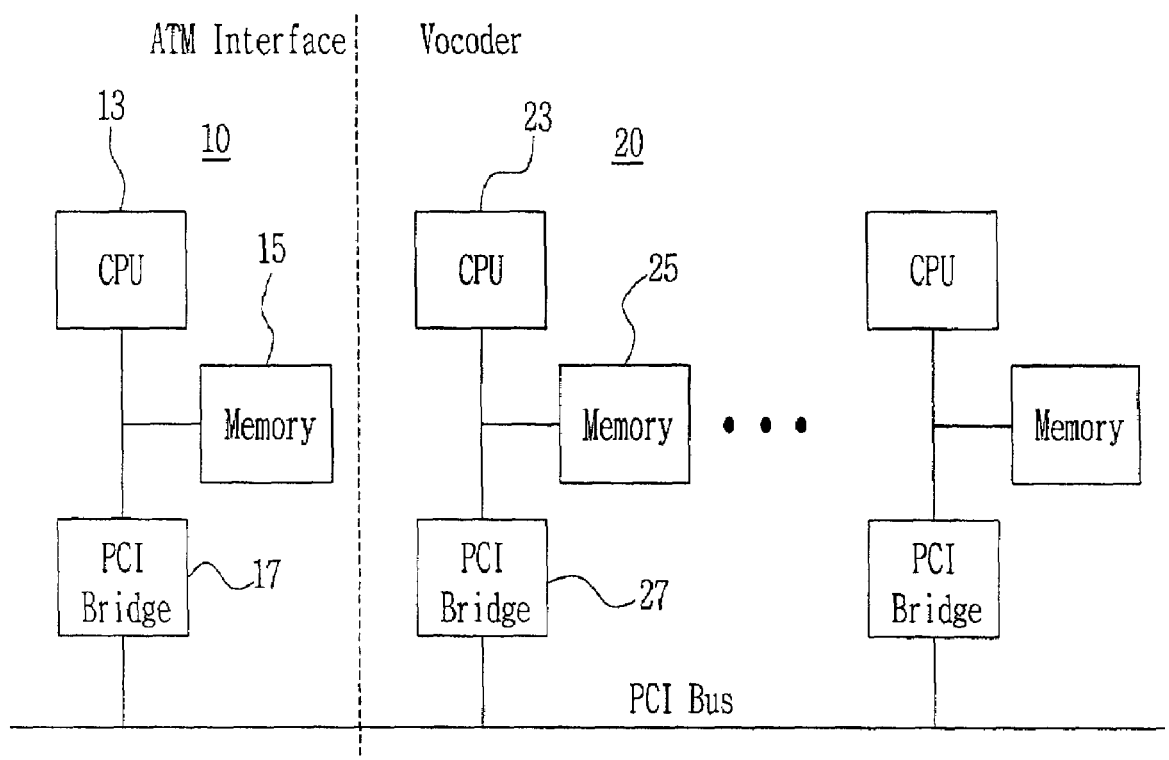
FIG. 2 illustrates a related art apparatus for the transfer of voice traffic in a VoDSL gateway.
Figure 3:
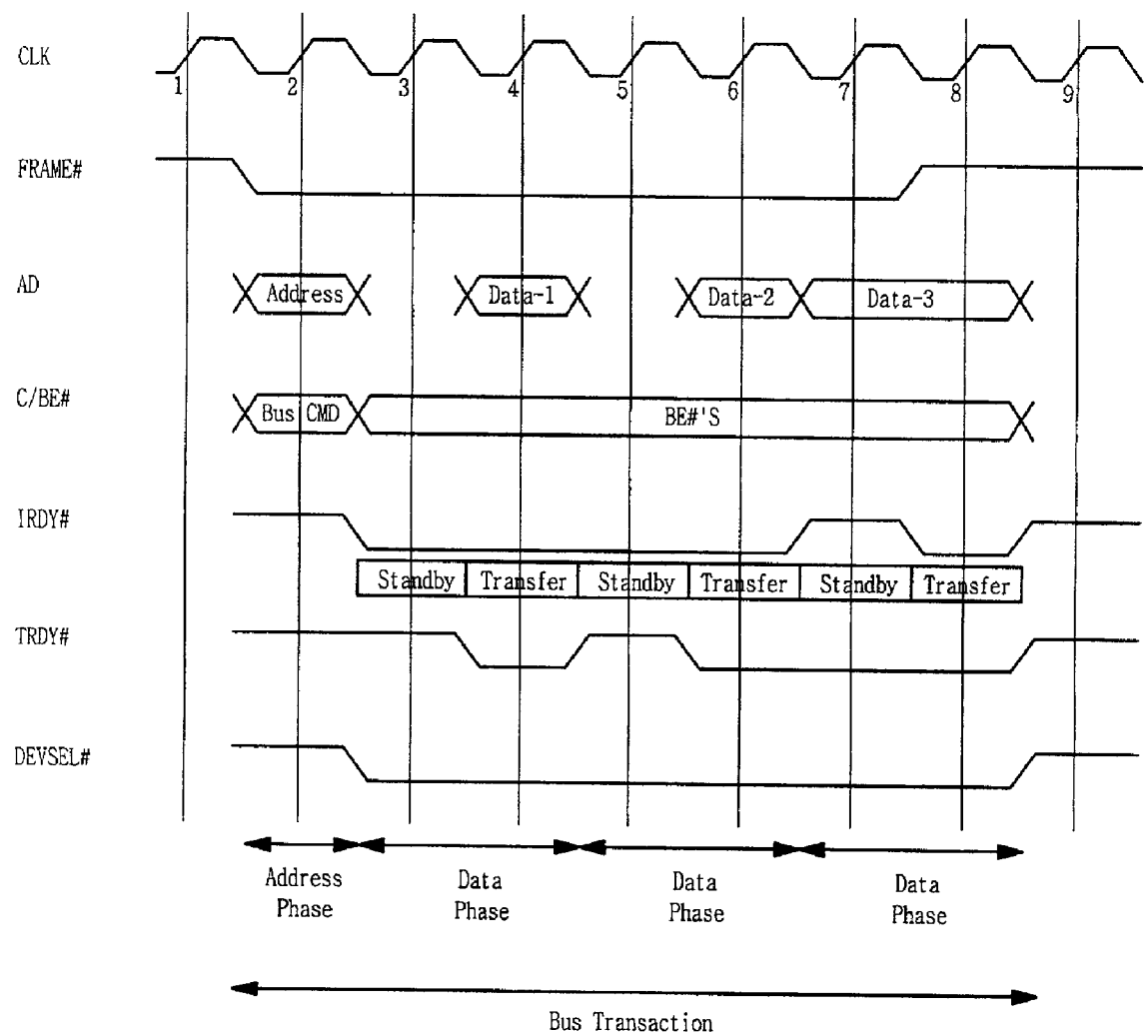
FIG. 3 illustrates a data input/output timing diagram of the VoDSL gateway of FIG. 2.
Figure 4:
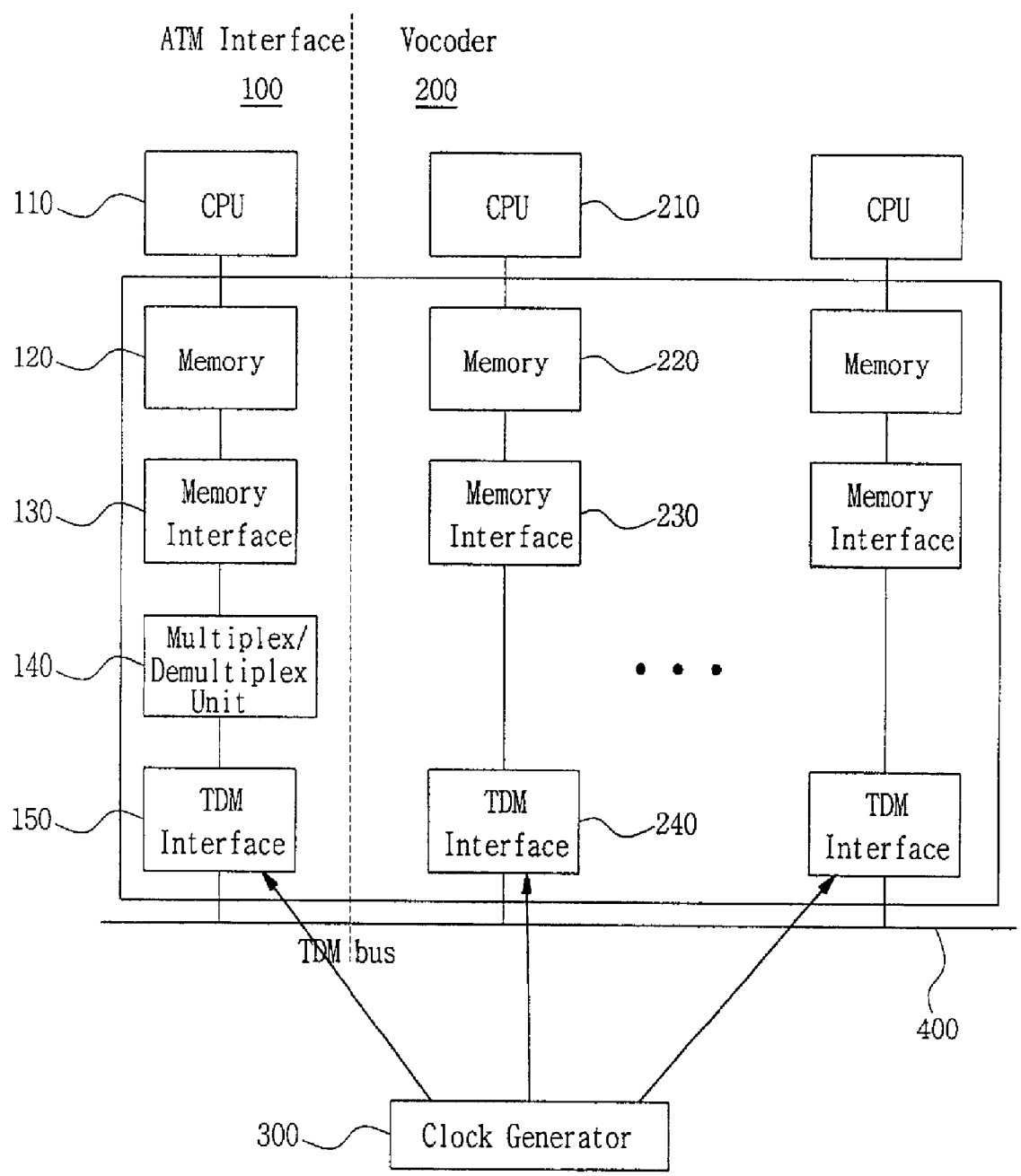
FIG. 4 illustrates the construction of an apparatus for the transfer of voice traffic in a VoDSL gateway, in accordance with the present invention.

FIG. 4 is a block diagram showing the construction of an apparatus used to transfer voice traffic in a VoDSL gateway, in accordance with the present invention. The VoDSL gateway voice traffic transfer apparatus comprises an ATM interface 100 connected to an ATM network, for disassembling an ATM cell signal from the ATM network or reassembling disassembled cells. A plurality of vocoders 200, each interfaced to a PSTN, transmit and receive voice traffic signals by channels to/from the PSTN. A TDM bus 400 transfers voice traffic signals between the ATM interface 100 and the plurality of vocoders 200. A clock generator 300 provides frame synchronization and packet synchronization signals, such as an 8 KHz frame synchronous (FS) signal, a 1 KHz FS signal, an 8 MHz clock signal, a 16 MHz clock signal, etc., to the ATM interface 100 and the plurality of vocoders 200.

The ATM interface 100 includes a CPU 110 performing CPS and SSCS functions, among AAL2 functions provided for Voice Telephony over ATM (VToA). A memory 120 stores voice data, generated according to the AAL2 CPS and SSCS functions, under the control of the CPU 110. A memory interface 130 accesses the memory 120 to read or write the voice data from/to the memory 120. A multiplex/demultiplex unit 140 demultiplexes output voice data from the memory interface 130 and converts the resulting parallel signals into a serial signal. The multiplex/demultiplex unit 140 is also adapted to multiplex output voice data from a TDM interface 150 and convert the resulting serial signal into parallel signals.

The TDM interface 150 functions to branch output voice data from the multiplex/demultiplex unit 140 to corresponding vocoders on the basis of paths determined during call setup procedures. The TDM interface 150 also functions to synchronize timings of voice data, transferred from the vocoders 200 over the TDM bus, with TDM timing.

Note that the TDM interface 150 processes the TDM timing required for transmission and reception of voice data to/from the vocoders on the basis of the clock signals from the clock generator 300, to phase-align voice packets of 50 Hz, 100 Hz, 1 KHz, etc. as well as a voice frame of 8 kHz.

Each of the vocoders 200 includes a TDM interface 240 for synchronizing timings of voice data, transmitted and received to/from the ATM interface 100 over the TDM bus, with the TDM timing and converting a serial data signal into parallel data signals, or vice versa. A memory 220 stores a voice traffic data signal. A memory interface 230 accesses the memory 220 to store voice data from the TDM interface 240 in the memory 220 or read voice data stored in the memory 220. A CPU 210 periodically reads the voice data stored in the memory 220 and transfers it to a digital signal processor (DSP) (not shown). The CPU 210 also functions to store a voice traffic data signal from the DSP in the memory 220.

The DSP is adapted to receive a voice traffic data signal from each vocoder's CPU 210, perform a vocoding operation for the received voice traffic data signal, convert the resulting signal into a PCM signal, and transfer the converted PCM signal to the PSTN.

Preferably, the G.726x and G.729x voice compression methods are employed by the VoDSL gateway. These voice compression methods serve to transfer voice data in a packet form, in a different manner from a G.711 PCM method. The TDM bus is designed so that 1 ms/10 ms/. . . /20 ms frame synchronous signals for voice packet synchronization, as well as the 8 KHz frame synchronous signal, can be used to support various voice compression methods, including the G.711 PCM method.

Figure 5:
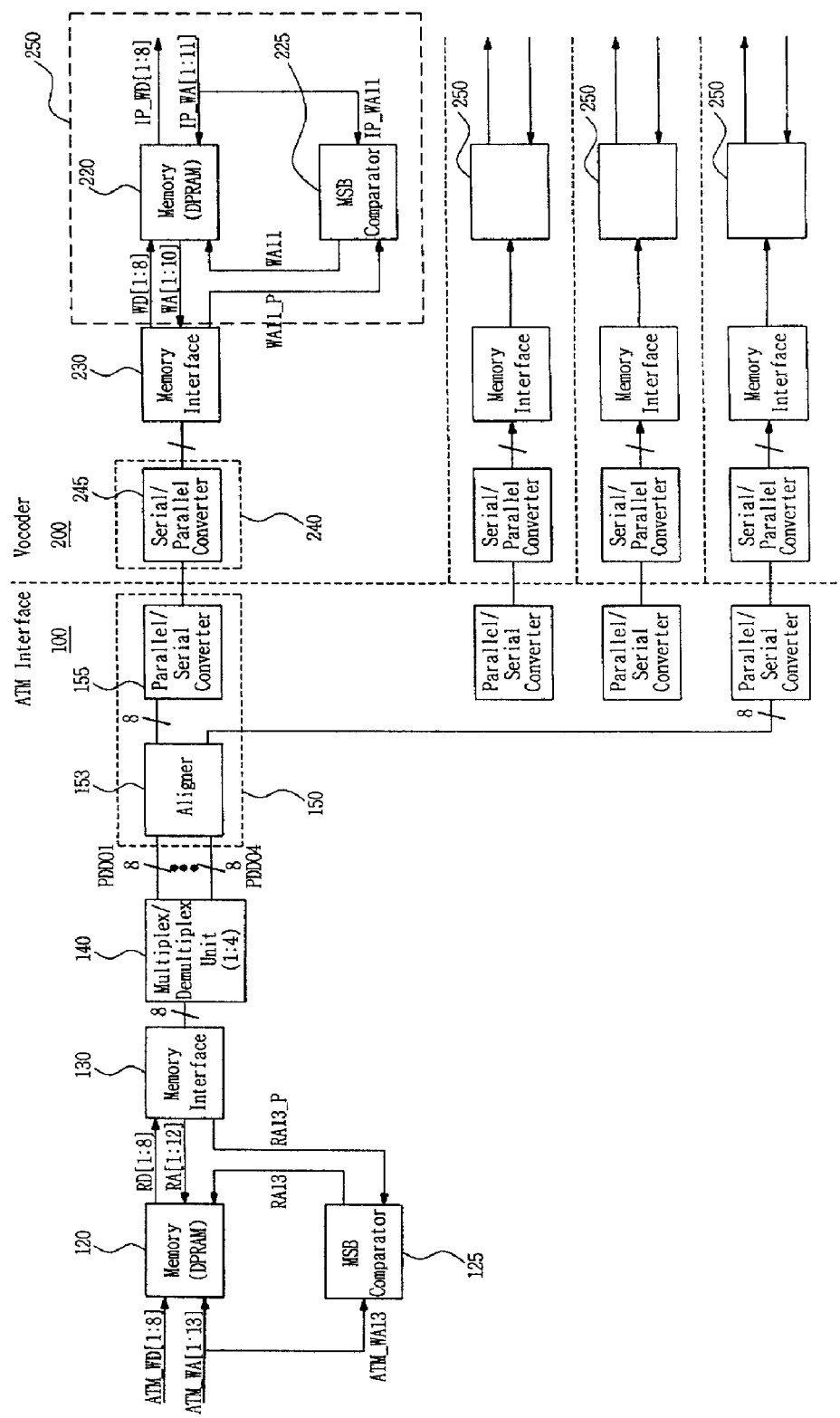
FIG. 5 illustrates the VoDSL gateway voice traffic transfer apparatus, according to the present invention, in the case where voice traffic is transferred from an ATM network to a PSTN.

FIG. 5 is a detailed block diagram of the VoDSL gateway voice traffic transfer apparatus, according to the present invention, illustrating an example where voice traffic is transferred from the ATM interface 100 to the vocoders 200.

The memory 120 of the ATM interface 100 stores voice traffic data transferred from the ATM network, under the control of the CPU 110. Access contention occurs when the CPU 110 and the memory interface 130 access the memory at the same time. In this regard, a most significant bit (MSB) comparator 125 is provided to prevent the CPU 110 and the memory interface 130 from simultaneously accessing the memory 120.

The CPU 110 writes the voice traffic data into the memory 120 and then stores an MSB, thereof, as a write MSB in a latch. The memory interface 130 may output a read MSB to the MSB comparator 125 to read the data stored in the memory 120.

In this case, the MSB comparator 125 compares the read MSB with the write MSB. As a result of the comparison, the MSB comparator 125 outputs the read MSB as the MSB of the read address if it is the same as the write MSB. Otherwise, the MSB comparator 125 toggles the read MSB and outputs the toggled MSB as the MSB of the read address.

Accordingly, the memory 120 must be implemented to have a dual buffer structure. For example, the memory 120 may have an 8-byte structure in case one voice packet is composed of 4 bytes.

Figure 6:
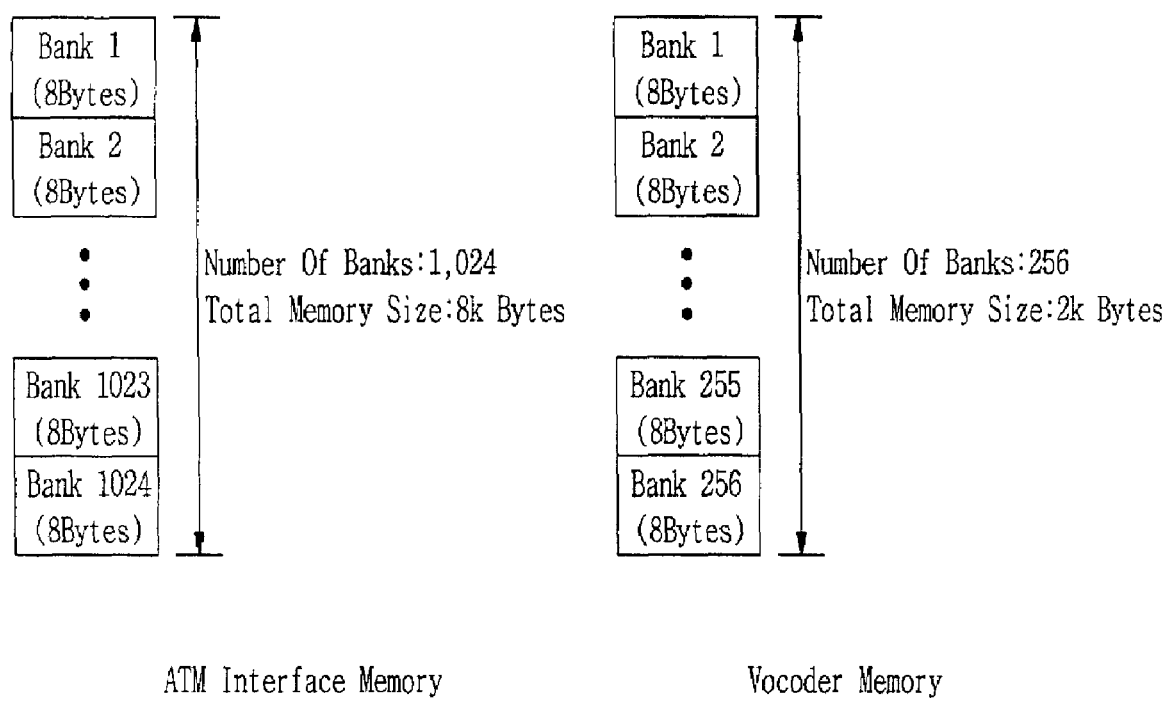
FIG. 6 illustrates memory configurations of an ATM interface and vocoder.

As seen from FIG. 6, the memory 120 in the ATM interface 100 has an 8 K-byte size because it is composed of 8 bytes for each of the 1024 channels. The memory 220 in each of the vocoders 200 has a 2 K-byte size because it is composed of 8 bytes for each of the 256 channels.

An address for the memory 120 in the ATM interface 100 is composed of a total of 13 bits because the memory 120 has the 8 K-byte size, and an address for the memory 220 in each of the vocoders 200 is composed of a total of 11 bits because the memory 220 has the 2 K-byte size.

The memory interface 130 successively reads the voice traffic data (voice packet data) stored in the memory 120, synchronously with the packet timing. The multiplex/demultiplex unit 140 demultiplexes the voice traffic data read from the memory 120 to direct it to the plurality of vocoders 200, because the single ATM interface 100 interacts with the plurality of vocoders 200. In the illustrated embodiment, the multiplex/demultiplex unit 140 performs a 4-channel demultiplexing operation.

An aligner 153 is provided to phase-align the voice traffic signals of different channels, outputted with different timings by the demultiplexing operation of the multiplex/demultiplex unit 140, such that the voice traffic signals are outputted with the same timing over the TDM bus. The aligner 153 supports this function in all data loading periods.

A parallel/serial converter 155 is provided to convert parallel voice traffic data signals, from the aligner 153, into a serial voice traffic data signal for communication over the serial TDM bus. The parallel/serial converter 155 is also adapted to send the serial voice traffic data signal synchronously, with the TDM bus timing, in response to the clock signals from the clock generator 300.

In each of the vocoders 200, a serial/parallel converter 245 receives the serial voice traffic data signal sent by the parallel/serial converter 155 over the TDM bus and converts it into parallel voice traffic data signals. The memory interface 230 writes voice data from the serial/parallel converter 245 into the memory 220. Under the control of the CPU 210, the voice data stored in the memory 220 is periodically read and transferred to the DSP.

A detailed description will hereinafter be given of the operation of the VoDSL gateway voice traffic transfer apparatus.

For example, one ATM interface 100 may have a 1024-channel VToA voice traffic processing capacity, one vocoder 200 may have a 256-channel vocoding processing capacity, and four vocoders 200 may be connected in common to one ATM interface 100.

Assume that the data transfer rate of the TDM bus is 16 Mbps (64 Kbps*256), a 32 Kbps G.726 voice compression technique is used for VToA, a voice packet unit is 1 ms, and voice traffic (voice packet) is directed from the ATM interface 100 to the vocoders 200.

The 1 KHz frame-synchronous signal, 1 KHz FS, is a 1 ms voice packet synchronization signal with a period of 1 ms. The 8 KHz frame-synchronous signal, 8 KHz FS, is a voice frame synchronization signal with a period of 2 ms. The 8 MHz clock signal is used when the ATM interface 100 reads the memory 120, and the 16 MHz clock signal is a synchronization clock signal used when the ATM interface 100 and the vocoders 200 are interconnected via the TDM bus.

As stated previously, the ATM interface 100 and vocoders 200 use the 1 KHz frame synchronous signal, 8 KHz frame synchronous signal, 8 MHz clock signal, 16 MHz clock signal, etc., for frame synchronization and packet synchronization, which are supplied from the clock generator 300.

Under the condition that the ATM interface 100 is supplied with the frame synchronization and packet synchronization clock signals from the clock generator 300, the memory interface 130 has to generate an address on the basis of the 8 MHz synchronous clock signal. This address is used to read four parallel bytes of the memory at a time, in an Adaptive Differential Pulse Code Modulation (ADPCM) manner, during a 1 ms period. In this case, the generated address is composed of 13 bits because the number of channels to be processed in the ATM interface 100 was previously assumed to be 1024.

As stated above, the memory interface 130 reads voice data from the memory 120 on the basis of the generated read address RA[13:1]. At this time, the memory interface 130 reads 1024-channel voice data from the memory 120 one byte at a time, for a period of one 8 KHz frame.

Figure 7:
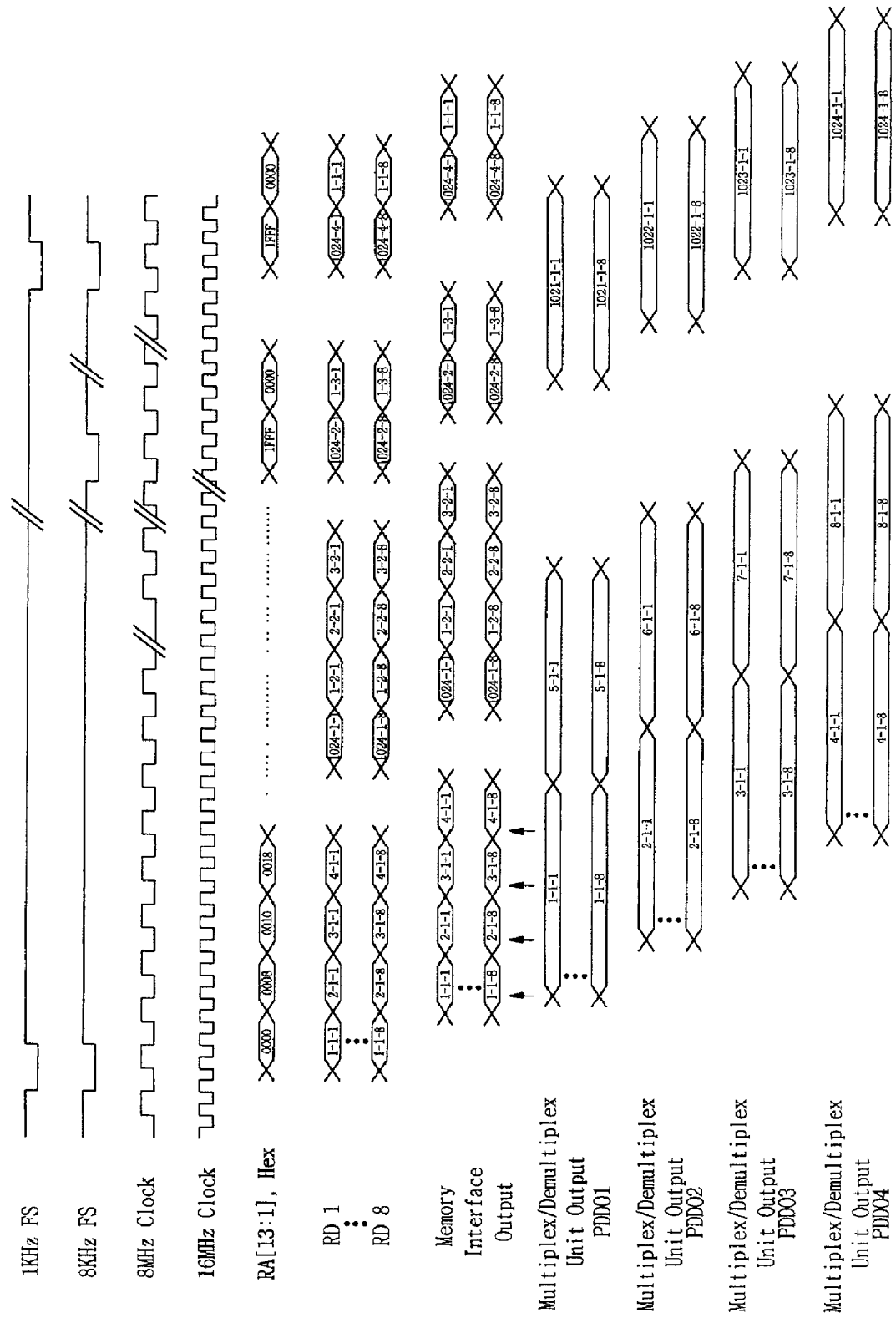
FIGS. 7 to 9 are timing diagrams illustrating the operation of the VoDSL gateway voice traffic transfer apparatus according to the present invention.
Figure 8:
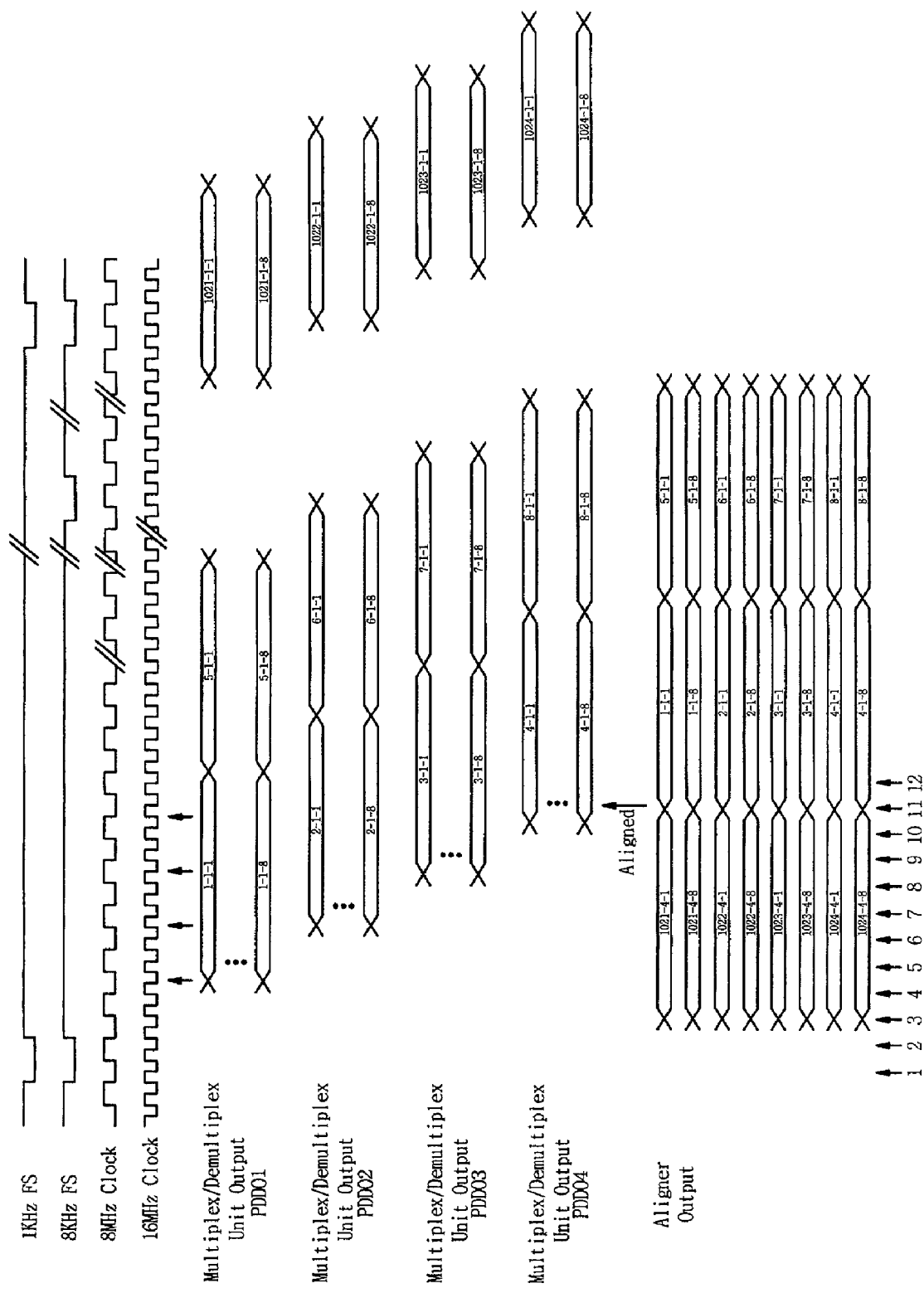
Figure 9:
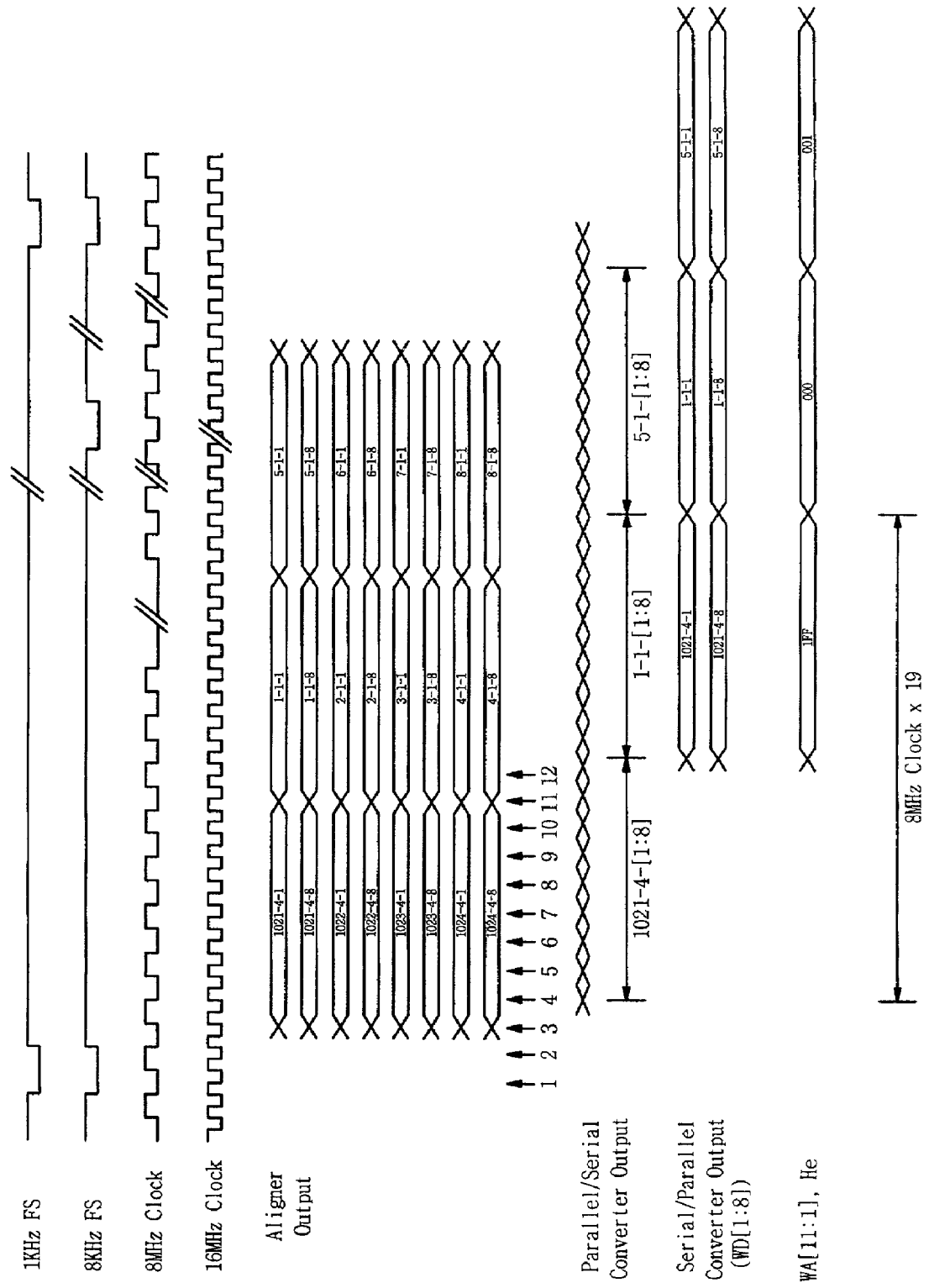

FIGS. 7 to 9, the notation 'x-y-z' of read data RD[1:8] denotes the xth channel (bank)-yth byte-zth bit. That is, the memory interface 130 reads voice traffic data signals from the memory 120 in order of 1-1-[1:8]→2-1-[1:8]→3-1-[1:8]→4-1-[1:8]→. . . →1024-1-[1:8](for a period of one 8 KHz frame, 125 ms)→1-2-[1:8]→2-2-[1:8]→. . . →1024-2-[1:8](for a total period of two 8 KHz frames, 250 ms)→1-3-[1:8]→2-3-[1:8]→. . . →1-8-[1:8]→. . . →1023-8-[1:8]→1024-8-[1:8](for a total period of 1 ms).

Since the 32 Kbps ADPCM method was previously assumed to be employed, data bytes 1-5-[1:8] to 1024-8-[1:8], among the read operation results from the memory 120, are dummy data. However, the memory interface 130 must be implemented in the above manner because a 64 Kbps PCM signal may be inputted in an actual application.

After reading the voice traffic data from the memory 120, with the read address RA[13:1] as described above, the memory interface 130 outputs the read data RD[1:8] after latching it once synchronously with the 8 MHz clock signal.

On the other hand, upon receiving the voice data from the memory interface 130, the multiplex/demultiplex unit 140 branches the received voice data respectively to the corresponding vocoders 200, synchronously with the 8 MHz clock signal and 8 KHz frame synchronous signal. As a result of the branching, the first vocoder is assigned voice traffic data of channels 1, 5, 9, ..., 1021, the second vocoder is assigned voice traffic data of channels 2, 6, 10, ..., 1022, the third vocoder is assigned voice traffic data of channels 3, 7, 11, ..., 1023, and the fourth vocoder is assigned voice traffic data of channels 4, 8, 12, ..., 1024. As stated previously, numbers of channels to be assigned to the respective vocoders can easily be modified according to a given memory operation.

The aligner 153 phase-aligns the voice traffic data signals, which are demultiplexed and outputted with different timings by the multiplex/demultiplex unit 140, such that the voice traffic data signals have the same timing. This phase alignment enables the ATM interface 100 and the respective vocoders to be interfaced with the same timing. Note that aligner 153 performs the phase alignment for the voice data in all data load periods.

Thereafter and synchronously with the 16 MHz clock signal, the parallel/serial converter 155 converts parallel voice data from the aligner 153 into serial voice data and sends the converted serial voice data over the TDM bus.

In each of the vocoders 200, the serial/parallel converter 245 receives the serial voice data sent over the TDM bus and converts it into parallel voice data, on the basis of the latest input bit, to store the converted parallel voice data in the memory 220.

Subsequently, the memory interface 230 generates a write address WA[11:1], on the basis of the parallel voice data from the serial/parallel converter 245, and then writes the parallel voice data into the memory 220 with the generated write address WA[11:1]. Since each vocoder 200 was previously assumed to have the 256-channel vocoding processing capacity, the generated write address is composed of 11 bits, to access 256 memory banks.

As seen from the last portion of FIG. 9, the time required to transfer voice traffic stored in the memory 120 of the ATM interface 100 to the memory 220 of each of the vocoders 200 is a period of 19 clocks, based on the 8 MHz clock signal (i.e., 122 ns*19≈2.3 ms).

As is apparent from the above description, the present invention provides an apparatus for the transfer of voice traffic in a VoDSL gateway. A TDM bus is provided between an ATM interface and the vocoders, thereby reducing the load on a CPU to process a larger amount of voice. Therefore, the QoS for the voice traffic can be improved by preventing voice data loss, resulting from a voice data delay.

Furthermore, the present apparatus uses 1 ms/10 ms/ . . . /20 ms frame-synchronous signals for voice packet synchronization, as well as an 8 KHz frame synchronous signal, so that it is applicable to all gateways employing various voice compression techniques, such as G.726 ADPCM, G.723.1, G.729x and the like, as well as a PCM transfer technique.

The above references are incorporated by reference herein where appropriate for appropriate teachings of additional or alternative details, features and/or technical background.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An interface between an asynchronous transfer mode (ATM) network and a public switched telephone network (PSTN), comprising:
    an ATM interface that communicates an ATM cell signal from and to the ATM network;
    a vocoder that communicates a voice signal from and to the PSTN by a channel; and
    a time division multiplex (TDM) bus that communicates a voice traffic signal between the ATM interface and the vocoder,
    wherein the ATM interface comprises a TDM interface that communicates the voice traffic signal with the vocoder over the TDM bus, synchronously with TDM timing, the TDM interface comprising:
    an aligner that phase-aligns the voice traffic signal from a multiplex/demultiplex unit in synchronization with the TDM timing, phase-aligns the voice traffic signal from the vocoder in synchronization with the TDM timing, and outputs the phase-aligned voice traffic signal from the vocoder to the multiplex/demultiplex unit; and
    a parallel/serial converter that converts first parallel voice traffic signals from the aligner into a first serial voice traffic signal, outputs the converted first serial voice traffic signal to the TDM bus, converts a second serial voice traffic signal sent over the TDM bus into second parallel voice traffic signals and outputs the second converted parallel voice traffic signals to the aligner.

2. The interface of claim 1, wherein the ATM interface further comprises:
    a central processing unit (CPU) that disassembles the ATM cell signal or reassembles disassembled cells in real time, according to an ATM Adaptation Layer 2 (AAL2) Common Part Sublayer (CPS) protocol and a Service Specific Convergence Sublayer (SSCS) protocol, and monitors and controls other function blocks;
    a memory that stores the voice traffic signal generated by a process of the CPU based on the AAL2 CPS and SSCS protocols and stores the voice traffic signal transferred from the vocoder; and
    a memory interface that accesses the memory for memory data input and output; and
    the multiplex/demultiplex unit that demultiplexes the voice traffic signal received from the memory interface and outputs a demultiplexed result to the vocoder and multiplexes the voice traffic signal received from the vocoder and outputs a multiplexed result to the memory interface.

3. The interface of claim 2, wherein the multiplex/demultiplex unit is further adapted to convert first parallel signals received from the memory interface into a first serial signal, convert a second serial signal received from the TDM interface into second parallel signals, and output the converted second parallel signals to the memory interface.

4. The interface of claim 2, wherein the ATM interface further comprises a most significant bit (MSB) comparator that latches a first MSB of data stored in the memory, compares the latched first MSB with a second MSB generated to read the stored data, and outputs the generated second MSB as a read MSB if the first and second MSBs are the same, thereby preventing a contention from occurring between a read operation and a write operation of the memory.

5. The interface of claim 1, wherein the vocoder comprises:
- a TDM interface connected to the TDM bus, the TDM interface synchronizes timings of the voice traffic signal, communicated with the ATM interface, with TDM timing and converts a serial voice traffic signal into parallel voice traffic signals;
- a memory that stores the parallel voice traffic signals from the TDM interface and the voice signal from the PSTN;
- a memory interface that accesses the memory to read data from or write the data to the memory; and
- a CPU that periodically reads first voice data stored in the memory, transfers the read first voice data to a digital signal processor (DSP), and stores second voice data transferred from the DSP in the memory.

6. The interface of claim 1, further comprising a clock generator that provides a plurality of clock signals for frame synchronization and packet synchronization to the ATM interface and the vocoder.

7. A method of communicating data between an asynchronous transfer mode (ATM) network and a public switched telephone network (PSTN), comprising:
- communicating first data from the ATM network to the PSTN, the communicating first data comprising:
  - demultiplexing the first data comprising a multiplexed stream of first parallel data units from the ATM network into multiple streams of second parallel data units;
  - synchronizing the multiple streams of second parallel data units in synchronization with TDM timing;
  - converting each of the multiple synchronized streams of second parallel data units into a stream of first serial data;
  - communicating each of the streams of first serial data through a time division multiplex (TDM) bus in an assigned time slot;
  - generating a voice signal from each of the streams of first serial data received through the TDM bus; and
  - transmitting each of the generated voice signals to a destination through the PSTN; and
- communicating second data from the PSTN to the ATM network, the communicating second data comprising:
  - converting the second data comprising a stream of serial data received from the PSTN over the TDM bus into a stream of third parallel data units;
  - phase-aligning the third parallel data units in synchronization with the TDM timing;
  - multiplexing the phase-aligned third parallel data units into a multiplexed stream of fourth parallel data units;
  - generating ATM packets from the multiplexed stream of fourth parallel data units; and
  - transmitting the generated ATM packets through the ATM network.

8. The method of claim 7, further comprising:
communicating each of multiple streams of second serial data through the TDM bus in an assigned time slot.

9. The method of claim 7, further comprising:
- comparing a first address bit corresponding to data stored in a memory with a second address bit generated for the purpose of reading the stored data;
- outputting the generated second address bit for use in a subsequent memory read operation if the first and second address bits have the same value, to prevent bus contention between a memory write operation and the memory read operation.

10. The method of claim 9, further comprising:
- toggling the value of the second address bit if the first and second address bits have different values;
- outputting the toggled second address bit for use in the subsequent memory read operation, to prevent bus contention between the memory read and write operations.

11. A communication gateway between an asynchronous transfer mode (ATM) network and a public switched telephone network (PSTN), comprising:
- a multiplexer/demultiplexer (demux) that demultiplexes a multiplexed stream of first parallel data units into multiple streams of second parallel data units;
- an aligner that phase aligns the multiple streams of second parallel data units in synchronization with TDM timing;
- a parallel-to-serial converter that converts each of the multiple aligned streams of second parallel data units from the aligner into a stream of first serial data;
- a time division multiplex (TDM) bus that communicates each of the streams of first serial data;
- a serial-to-parallel converter that receives each of the streams of first serial data from the TDM bus in an assigned time slot and converts the streams of first serial data into second parallel data units and outputs the second parallel data units to the aligner;
- multiple vocoders that each generate one of generated voice signals from a separate one of the streams of first serial data received by the serial-to-parallel converter, the aligner phase-aligning the generated voice signals from the vocoders in synchronization with the TDM timing and outputting the phase-aligned voice signals to the multiplexer/demultiplexer;
- a public switched telephone network interface that transmits each of the generated voice signals to a destination at the PSTN; and
- an asynchronous transfer mode (ATM) interface that generates ATM packets and transmits the generated ATM packets to the ATM network.

12. The gateway of claim 11, wherein:
- the serial-to-parallel converter communicates each of multiple streams of second serial data through the TDM bus in an assigned time slot;
- the parallel-to-serial converter converts each of the multiple streams of second serial data units into a stream of third parallel data units; and
- the demux multiplexes the multiple streams of third parallel data units into a multiplexed stream of fourth parallel data units.

13. The gateway of claim 12, further comprising multiple vocoders that encode multiple voice signals, received through the public switched telephone network interface, into the corresponding multiple streams of second serial data.

14. The gateway of claim 12, wherein the asynchronous transfer mode (ATM) interface generated the ATM packets from the multiplexed stream of fourth parallel data units and transmits the generated ATM packets to the ATM network.

15. The gateway of claim 11, further comprising:
a memory that stores data; and
a comparator that compares a first address bit, corresponding to the data stored in the memory, with a second address bit generated for the purpose of reading the stored data, wherein
the comparator outputs the generated second address bit for use in a subsequent memory read operation if the first and second address bits have the same value, to prevent bus contention between a memory write operation and the memory read operation.

16. The gateway of claim 15, wherein:
the comparator toggles the value of the second address bit if the first and second address bits have different values; and
outputs the toggled second address bit for use in the subsequent memory read operation, to prevent bus contention between the memory read and write operations.

\* \* \* \* \*